United States Patent
Tsou (10) Patent No.: US 9,614,840 B2
(45) Date of Patent: Apr. 4, 2017

(54) NETWORK AUTHENTICATION METHOD AND SYSTEM BASED ON EYE TRACKING PROCEDURE

(71) Applicant: UTECHZONE CO., LTD., New Taipei (TW)

(72) Inventor: Chia-Chun Tsou, New Taipei (TW)

(73) Assignee: UTECHZONE CO., LTD., New Taipei (TW)

(*) Notice: Subject to any disclaimer, the term of this patent is extended or adjusted under 35 U.S.C. 154(b) by 118 days.

(21) Appl. No.: 14/620,157

(22) Filed: Feb. 11, 2015

(65) Prior Publication Data
US 2016/0112414 A1    Apr. 21, 2016

(30) Foreign Application Priority Data

Oct. 15, 2014    (TW) .............................. 103135648 A (51) Int. Cl.
| | |
|---|---|
| *G06F 21/32* | (2013.01) |
| *H04L 29/06* | (2006.01) |
| *G06F 3/01* | (2006.01) |
| *G06K 9/00* | (2006.01) |

(52) U.S. Cl.
CPC .......... *H04L 63/0861* (2013.01); *G06F 3/013* (2013.01); *G06F 21/32* (2013.01); *G06K 9/0061* (2013.01); *G06K 9/00255* (2013.01); *G06K 9/00288* (2013.01); *G06K 9/00604* (2013.01); *G06K 9/00617* (2013.01); *H04L 63/083* (2013.01)

(58) Field of Classification Search
CPC .... H04L 63/083; H04L 63/0861; G06F 21/32
See application file for complete search history.

(56) References Cited

U.S. PATENT DOCUMENTS

| | | | | |
|---|---|---|---|---|
| 5,615,277 A | * | 3/1997 | Hoffman | ................. G06F 21/32 382/115 |
| 6,505,193 B1 | * | 1/2003 | Musgrave | ............... G06F 21/32 |
| 2013/0015946 A1 | * | 1/2013 | Lau | .......................... G07C 9/00 340/5.2 |
| 2015/0302252 A1 | * | 10/2015 | Herrera | .............. G06K 9/00617 382/117 |

* cited by examiner

*Primary Examiner* — Saleh Najjar
*Assistant Examiner* — Devin Almeida
(74) *Attorney, Agent, or Firm* — Jianq Chyun IP Office (57) ABSTRACT

A network authentication method and a system based on an eye tracking procedure are provided. An image capturing unit of a user terminal captures a face image sequence of a user, and transmits the face image sequence to a server terminal such that the server terminal executes an authentication procedure to return an authentication result. The user terminal executes an eye tracking procedure based an eye movement of the user. The user terminal transmits an emergency signal to the server terminal if the user terminal determines that an emergency mode is triggered during the eye tracking procedure.

22 Claims, 9 Drawing Sheets

NETWORK AUTHENTICATION METHOD AND SYSTEM BASED ON EYE TRACKING PROCEDURE

CROSS-REFERENCE TO RELATED APPLICATION

This application claims the priority benefit of Taiwan application ser. no. 103135648, filed on Oct. 15, 2014. The entirety of the above-mentioned patent application is hereby incorporated by reference herein and made a part of this specification.

BACKGROUND OF THE INVENTION

Field of the Invention

The invention relates to an eye tracking technology, and more particularly, relates to a network authentication method and system based on an eye tracking procedure.

Description of Related Art

Currently, the eye tracking technology is mainly divided into two types including an invasive type and a non-invasive type. In the eye tracking technology of the invasive type, a search coil is disposed in the eye or an electrooculogram is used. Whereas the eye tracking technology of the non-invasive type may be further divided into free-head or head-mount eye tracking technologies. With improvement in technology, the eye tracking technology has been widely applied in various fields including neuroscience, psychology, industrial engineering, human factors engineering, marketing, advertising, computer science, and so on.

The eye tracking technology is capable of assisting persons with speaking inconvenience and physical difficulties in communication, and providing more conveniences to those with limited mobility. For example, with assistance of an eye movement electronic product, they are able to use their eyes as a replacement of a mouse in order to complete actions such as communication, net-surfing or entertainment.

SUMMARY OF THE INVENTION

The invention is directed to a network authentication method and system based on an eye tracking procedure, which are capable of providing an eye movement inputting mechanism such that the operations thereof are more diverse.

A network authentication method based on an eye tracking procedure of the invention includes the following steps. Authentication interface information is received by a user terminal via a network to be displayed on a display unit of the user terminal. A face image sequence of a user of the user terminal is captured by an image capturing unit of the user terminal. The face image sequence is transmitted to a server terminal by the user terminal such that the server terminal executes an authentication procedure of the user terminal according to the face image sequence. An authentication result is received from the server terminal by the user terminal. When the authentication result is verified and passed, the authentication interface information is displayed on the display unit of the user terminal, and an eye image sequence of the user of the user terminal is captured by the image capturing unit of the user terminal. An eye tracking procedure is executed according to the eye image sequence by the user terminal, so as to input operating information of the user through the eye tracking procedure. The authentication interface information has an emergency mode, and the user terminal transmits an emergency signal to the server terminal if the user terminal determines that the emergency mode is triggered by the user during the eye tracking procedure based on the eye image sequence.

A network authentication system based on an eye tracking procedure of the invention includes a server terminal and a user terminal. The user terminal is connected to the server terminal via a network. The user terminal includes a communication unit, a display unit, an image capturing unit and a control unit. The communication unit is connected to the network. The display unit displays authentication interface information received from the server terminal. The image capturing unit captures a face image sequence of a user. The control unit is coupled to the communication unit, the display unit and the image capturing unit. The control unit transmits the face image sequence to the server terminal by the communication unit such that the server terminal executes an authentication procedure of the user terminal according to the face image sequence and receives an authentication result from the server terminal by the communication unit, and the control unit drives an eye movement detection module to realize an eye tracking procedure when the authentication result is verified and passed. When the authentication result is verified and passed, the authentication interface information is displayed on the display unit, and an eye image sequence of the user of the user terminal is captured by the image capturing unit for the eye movement detection module to execute the eye tracking procedure according to the eye image sequence, so as to input operating information of the user through the eye tracking procedure. The authentication interface information has an emergency mode, and the control unit transmits an emergency signal to the server terminal by the communication unit if the eye movement detection module determines that the emergency mode is triggered by the user during the eye tracking procedure based on the eye image sequence.

A network authentication method based on an eye tracking procedure of the invention, which is suitable for a server terminal, and includes the following steps. Authentication interface information is transmitted to a user terminal to be displayed on a display unit of the user terminal. The authentication interface information has an emergency mode. A face image sequence of a user of the user terminal captured by an image capturing unit of the user terminal is received from the user terminal. An authentication procedure of the user terminal is executed according to the face image sequence. An authentication result is transmitted to the user terminal. An eye image sequence is received from the user terminal. The eye image sequence is captured by the image capturing unit of the user terminal when the authentication result is verified and passed and the authentication interface information is displayed on the display unit of the user terminal. An eye tracking procedure is executed according to the eye image sequence, so as to input operating information of the user through the eye tracking procedure. In a process of executing the eye tracking procedure, an emergency signal is generated when determining that the emergency mode is triggered by the user during the eye tracking procedure based on the eye image sequence.

Based on the above, the user is able to execute the eye tracking procedure during the authentication procedure by the eye-ball movement, such that the operations thereof are more diverse.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
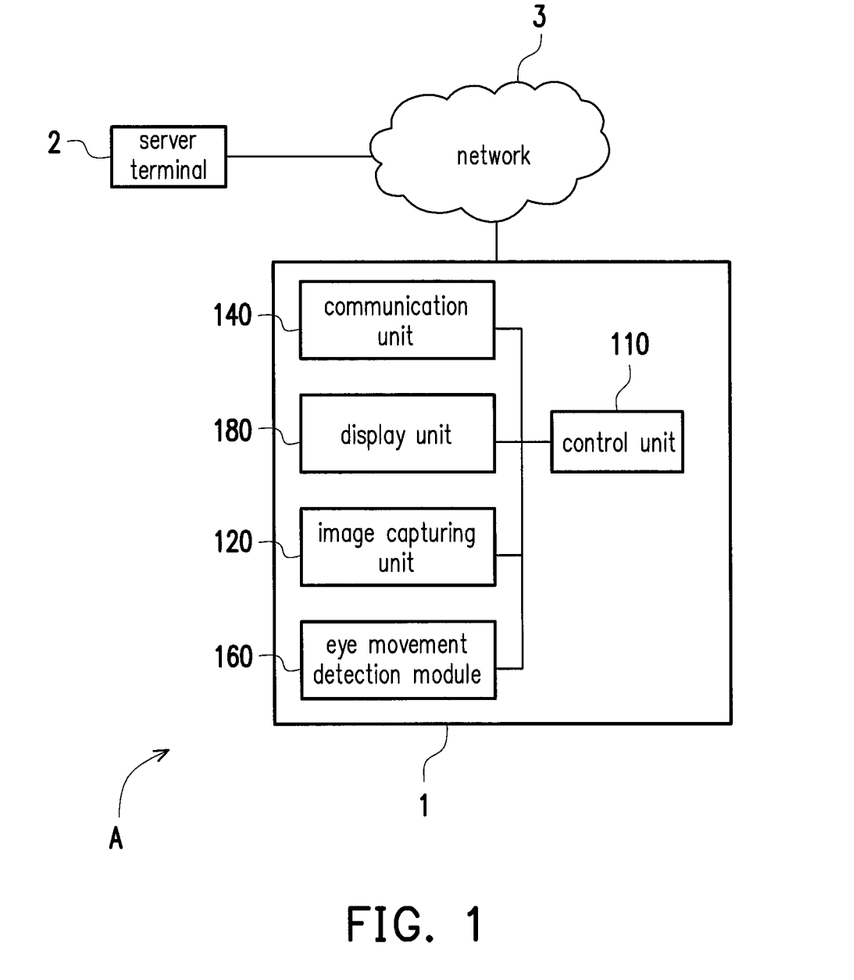
FIG. 1 is a block diagram illustrating a network authentication system based on an eye tracking procedure according to an embodiment of the invention.

FIG. 1 is a block diagram illustrating a network authentication system based on an eye tracking procedure according to an embodiment of the invention. Referring to FIG. 1, a network authentication system A includes a user terminal 1 and a server terminal 2. The user terminal 1 is connected to the server terminal 2 via a network 3. The user terminal 1 includes a communication unit 140, a display unit 180, an image capturing unit 120 and a control unit 110. The communication unit 140 is connected to the network 3. The display unit 180 displays authentication interface information received from the server terminal 2. The image capturing unit 120 captures a face image sequence of a user. The control unit 110 is coupled to the communication unit 140, the display unit 180 and the image capturing unit 120. The control unit 110 drives an eye movement detection module 160 to realize an eye tracking procedure.

Figure 2:
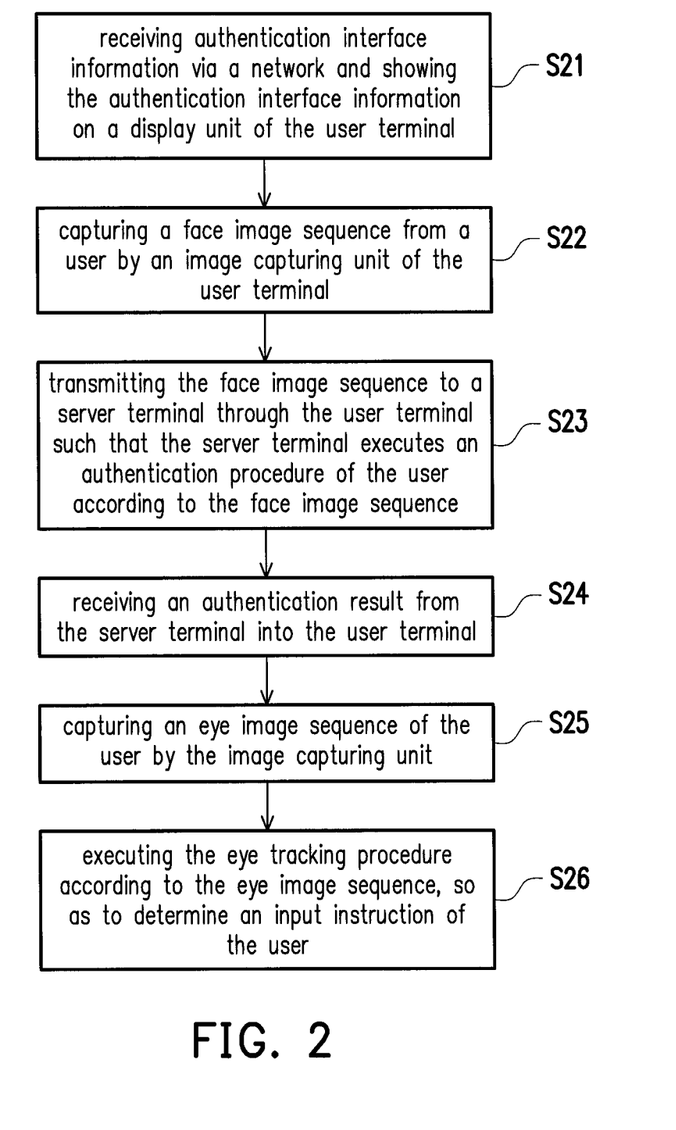
FIG. 2 is a flowchart illustrating a network authentication method based on an eye tracking procedure according to an embodiment of the invention.

FIG. 2 is a flowchart illustrating a network authentication method based on an eye tracking procedure according to an embodiment of the invention. Referring to FIG. 1 and FIG. 2, in step S21, the user terminal 1 receives the authentication interface information from the server terminal 2 via the network 3 and shows the authentication interface information on the display unit 180 of the user terminal 1. Herein, the authentication interface information provides, for example, an eye authentication interface to be displayed on the display unit 180, and the authentication interface information includes an emergency mode.

In step S22, the face image sequence from the user is captured by the image capturing unit 120 of the user terminal 1. Further, in step S23, the face image sequence is transmitted to the server terminal 2 through the user terminal 1 for the server terminal 2 to execute an authentication procedure of the user according to the face image sequence.

In step S24, an authentication result is received from the server terminal 2 into the user terminal 1. In step S25, when the authentication result is verified and passed, the authentication interface information is displayed on the display unit 180 of the user terminal 1, and an eye image sequence of the user is captured by the image capturing unit 120. For example, the user terminal 1 receives a face recognition result from the server terminal 2. When the face recognition result is verified and passed, the authentication interface information is displayed on the display unit 180 of the user terminal 1, and the eye image sequence of the user of the user terminal 1 is captured by the image capturing unit 120 of the user terminal 1. Alternatively, the user terminal 1 receives an eye recognition result from the server terminal 2 (which includes an iris recognition result and a sclera vascular pattern recognition result). When the eye recognition result is verified and passed, the authentication interface information is displayed on the display unit 180 of the user terminal 1, and the eye image sequence of the user of the user terminal 1 is captured by the image capturing unit 120 of the user terminal 1.

In step S26, an eye tracking procedure is executed according to the eye image sequence, so as to determine an input instruction of the user. Herein, the authentication interface information has an emergency mode, and the user terminal 1 transmits an emergency signal to the server terminal 2 if the user terminal 1 determines that the emergency mode is triggered by the user during the eye tracking procedure based on the eye image sequence.

Figure 3:
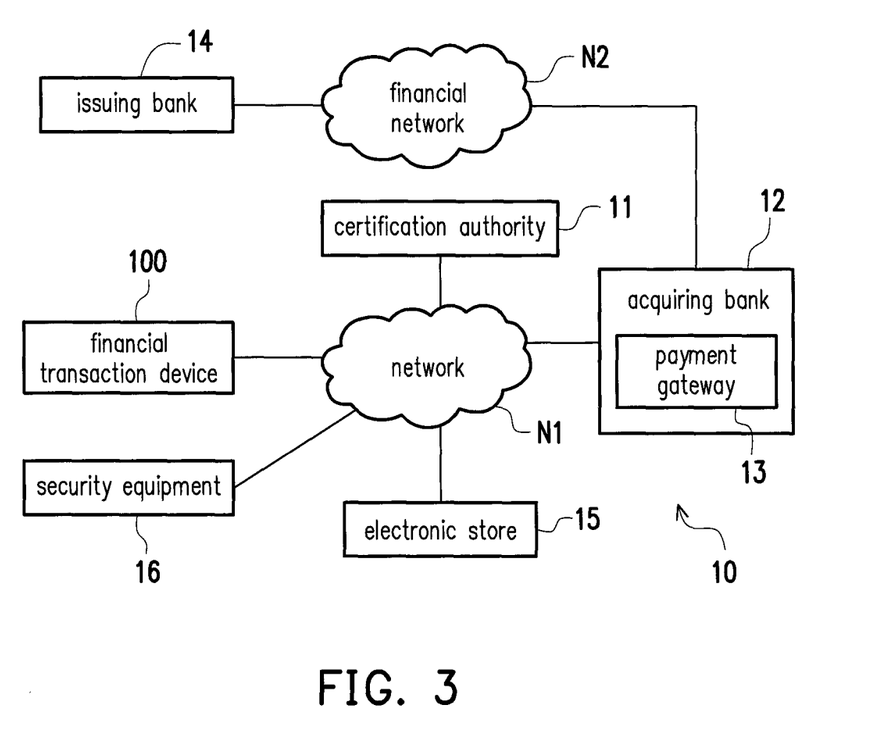
FIG. 3 is a block diagram of a financial transaction system according to an embodiment of the invention.

Aforesaid network authentication system A may be applied in a financial transaction system, and an example thereof is provided below for further description. FIG. 3 is a block diagram of a financial transaction system according to an embodiment of the invention. Referring to FIG. 3, a financial transaction system 10 includes a financial transaction device 100, a certification authority 11, an acquiring bank 12, a payment gateway 13, an issuing bank 14, an electronic store 15 and a security equipment 16. Herein, the financial transaction device 100 serves as the user terminal. The server terminal includes the certification authority 11, the acquiring bank 12, the payment gateway 13, the issuing bank 14, the electronic store 15 and the security equipment 16.

The financial transaction device 100, the certification authority 11, the acquiring bank 12, the electronic store 15 and the security equipment 16 are communicated with one other via a network N1 (e.g., Internet). The acquiring bank 12 and the issuing bank 14 are communicated via a financial network N2. The financial network N2 is a private network required for credit card transaction on line, such as the existing VisaNet.

Figure 4:
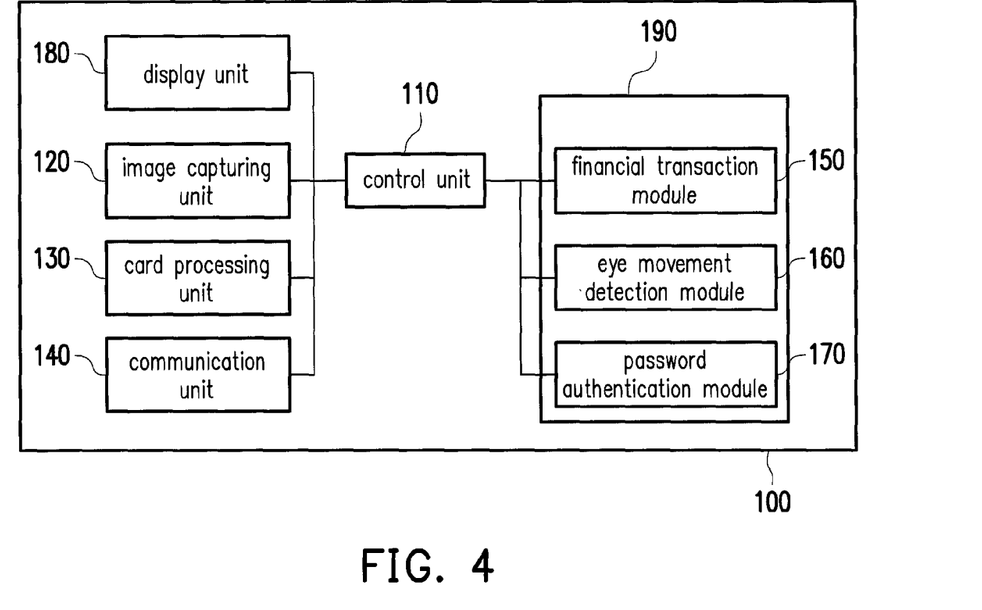
FIG. 4 is a block diagram of a financial transaction device according to an embodiment of the invention.

In the present embodiment, a purchaser first needs to apply for a legal credit card at card issuers. Thereafter, the credit card needs to register to the certification authority 11 through the financial transaction device 100, such that the related transactions of electronic commerce may then be conducted. FIG. 4 is a block diagram of a financial transaction device according to an embodiment of the invention.

Referring to FIG. 4, the financial transaction device 100 includes the control unit 110, the image capturing unit 120, a card processing unit 130, the communication unit 140, the display unit 180 and a storage unit 190. The storage unit 190 stores a plurality of modules, and the modules include a financial transaction module 150, an eye movement detection module 160 and a password authentication module 170. The control unit 110 is coupled to the image capturing unit 120, the card processing unit 130, the communication unit 140, the display unit 180 and all of aforesaid modules.

The image capturing unit 120 is configured to capture an image sequence including the user (including at least one of the face image sequence and the eye image sequence). The card processing unit 130 is, for example, a card reader externally connected to the financial transaction device 100 or a card reader built in the financial transaction device 100, and configured to receive a financial transaction card and read data from the financial transaction card. The communication unit 140 is optionally disposed in the financial transaction device 100. The financial transaction device 100 can connect to various financial institutions (the electronic store 15, the acquiring bank 12, the certification authority 11) or the security equipment 16.

The control unit 110 is, for example, a central processing unit (CPU), or other programmable microprocessors. Each of the financial transaction module 150, the eye movement detection module 160 and the password authentication module 170 is, for example, composed of a plurality of program code sections and stored in the storage unit 190. Alternatively, in other embodiments, each of the financial transaction module 150, the eye movement detection module 160 and the password authentication module 170 may also be a chip set composed of a plurality of digital logic gates. The control unit 110 drives and executes the financial transaction module 150, the eye movement detection module 160 and the password authentication module 170 to realize a financial transaction procedure.

In a more preferable embodiment, the eye movement detection module 160 can execute a calibration procedure on the image capturing unit 120 in advance. For instance, before detecting locations of an eye-ball, a plurality of calibration images may be sequentially received from the image capturing unit 120. Herein, the calibration images are images including the user which are respectively obtained when the user is looking at a plurality of calibration points of the display unit 180. For example, four points (upper-left, upper-right, lower-left, lower-right) of the display unit 180 may serve as calibration points. During the calibration procedure, the display unit 180 prompts the user to look at said four calibration points, so as to obtain four calibration images. The eye movement detection module 160 obtains a reference calibration parameter according to two reflex point locations of an eye area in each of the calibration images. The two reflex point locations are formed on the eye-ball by using a light-emitting unit disposed in the image capturing unit 120. The reference calibration parameter is obtained according to the two reflex point locations in each of the calibration images.

Figure 5:
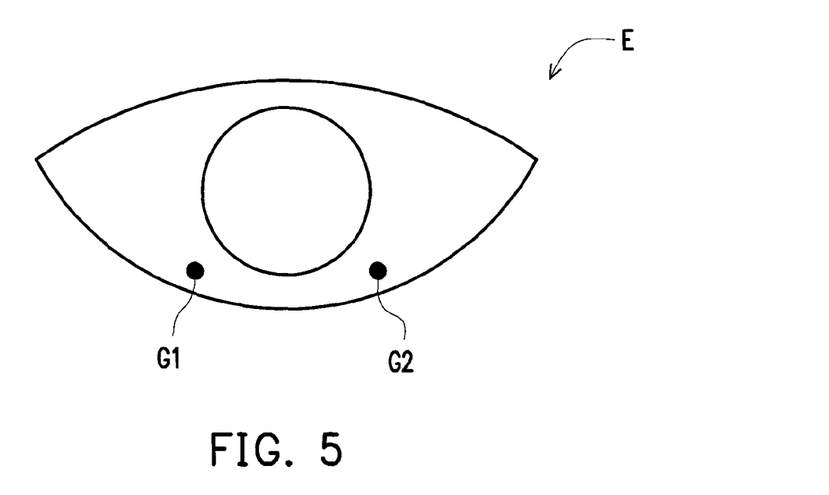
FIG. 5 is a schematic diagram illustrating a reflex point location according to an embodiment of the invention.

For instance, FIG. 5 is a schematic diagram illustrating a reflex point location according to an embodiment of the invention. As shown in FIG. 5, two reflex point locations G1 and G2 are included in an eye area E. The reference calibration parameter is, for example, vectors based on the reflex point locations G1 and G2. Further, a coordinate transformation matrix is generated by a perspective transformation method based on the calibration images. The coordinate transformation matrix is configured to transform a coordinate position of the eye area into a coordinate position of the display unit 180.

The eye movement detection module 160 detects the eye area in a current image of the image sequence, so as to obtain a pupil location and two reflex point locations (hereinafter, referred to as the reflex points G1' and G2') in the current image. Further, the eye movement detection module 160 obtains a comparison calibration parameter according to the reflex point locations G1' and G2', so as to further obtain a dynamic correction parameter (C3) according to a reference calibration parameter (C1) and a comparison calibration parameter (C2). For example, the dynamic correction parameter is a ratio of the reference calibration parameter and the comparison calibration parameter, namely, C3=C2/C1. Thereafter, the eye movement detection module 160 then calculates an eye-ball moving coordinate according to the reflex point location G1' (or the reflex point location G2'), the pupil location (e.g., which is calculated by using a coordinate at a center of the pupil) and the dynamic correction parameter. For example, the eye-ball moving coordinate is (X', Y'). The eye movement detection module 160 uses the coordinate transformation matrix to transform the eye-ball moving coordinate (X', Y') into a sight location coordinate of the display unit 180 (e.g., the sight location coordinate is (Xs, Ys)). Thereafter, the sight location coordinate (Xs, Ys) is recorded. Accordingly, a motion trajectory of the eye-ball may be obtained according to a plurality of the sight location coordinates being recorded, and an orientation that the user is currently gazing may be obtained according to the sight location coordinate.

The financial transaction module 150 provides a registration service and a financial transaction service. The purchaser can register to the certification authority 11 by using the registration service provided by the financial transaction device 100. The financial transaction procedure can be executed by using the financial transaction service provided by the financial transaction device 100 only after the registration is completed.

Referring back to FIG. 3, the certification authority 11 serves to verify an identity of the purchaser. More specifically, the certification authority 11 provides the registration service to all transacting targets on the network (including the purchaser, the electronic store 15 and the acquiring bank 12), and transmits a digital certificate being registered to the registrant. When registration actions are completed by the purchaser, the electronic store 15 and the acquiring bank 12, the digital certificate may be used as a proof of identity. Nevertheless, said embodiment is merely an example, and the invention is not limited thereto.

The acquiring bank 12 provides the payment gateway 13, and provides an authorization and payment service on the network (which mainly provides services for credit card payment transaction) through the payment gateway 13.

Figure 6:
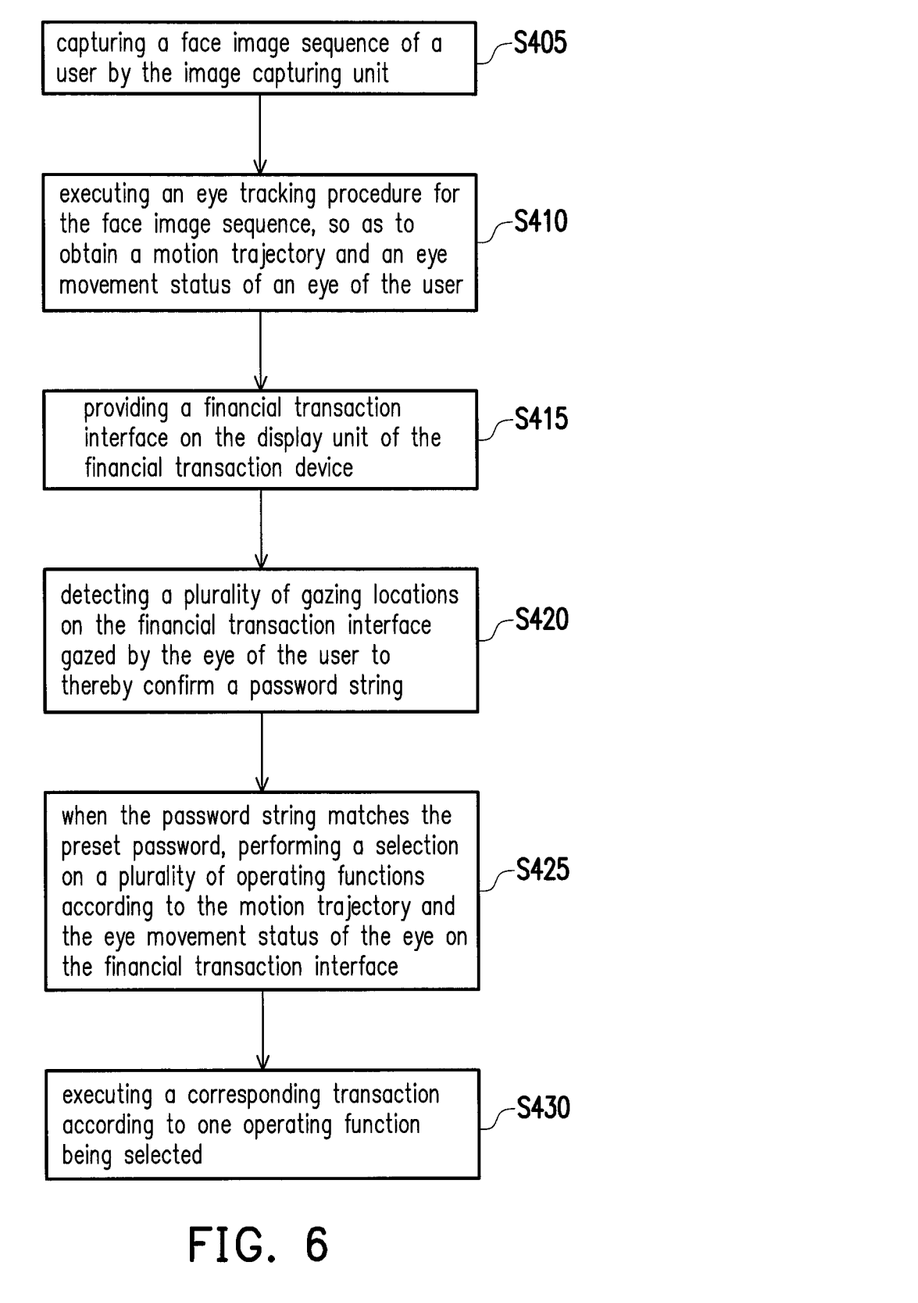
FIG. 6 is a flowchart illustrating a financial transaction method based on an eye tracking procedure according to an embodiment of the invention.

FIG. 6 is a flowchart illustrating a financial transaction method based on an eye tracking procedure according to an embodiment of the invention. Detailed description is provided below with reference to aforesaid financial transaction device 100. In the present embodiment, the user has already completed the registration to the certification authority 11 in advance by using the financial transaction device 100.

Referring to FIG. 6, in step S405, a face image sequence of the user is captured by the image capturing unit 120. Next, in step S410, the control unit 110 executes an eye tracking procedure for the face image sequence by using the eye movement detection module 160, so as to obtain a motion trajectory and an eye movement status of an eye of the user on the display unit 180. Herein, the control unit 110 can obtain the eye image sequence from the face image sequence in advance, so as to execute the eye tracking procedure on the eye image sequence. For instance, the eye movement status includes at least one of a blinking movement (including a number of times of the blinking, whether it blinks or not, etc.), a gazing time, a pupil shift quantity and a sight direction.

For example, the eye movement detection module 160 detects the pupil location and the flex point location of the user in the eye image sequence to determine the sight location of the eye according to the pupil location and the reflex point location. Herein, the reflex point location is a reflex point formed by emitting a light beam on the eye of the user by a light emitting unit. Specifically, after a face object is obtained from the face image sequence in advance, the eye movement detection module 160 can further search a nostril area in the face object to obtain nostril location information. Subsequently, an eye search frame is estimated according to the nostril location information in order to detect an eye area within the eye search frame. In other words, as compared to the eye, a nostril is easier to recognize in the image. Therefore, after the nostril is found, the eye search frame may be estimated upwardly with respect to the nostril, such that the eye area may be found within the eye search frame to thereby reduce a search range for searching the eye. After the eye area is obtained, the eye movement detection module 160 can obtain the pupil location and the reflex point location from the eye area. The eye movement detection module 160 can then determine the sight location of the eye on the financial transaction interface on the display unit 180 according to a correspondence relationship between locations of the pupil location and the reflex point location.

Figure 7A:
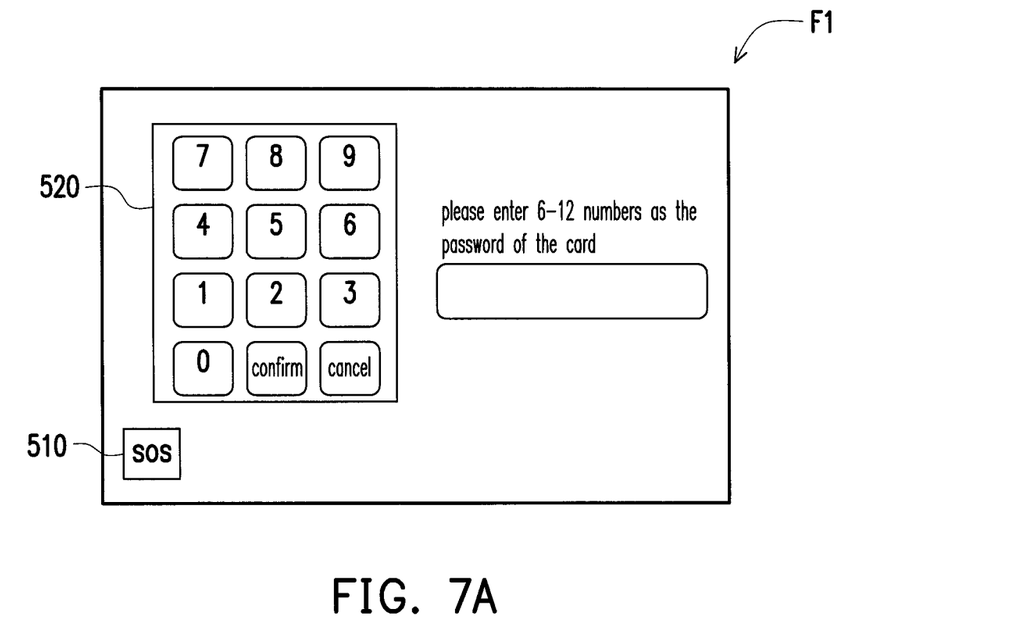
FIG. 7A and FIG. 7B are schematic diagrams illustrating a financial transaction interface according to an embodiment of the invention.
Figure 7B:
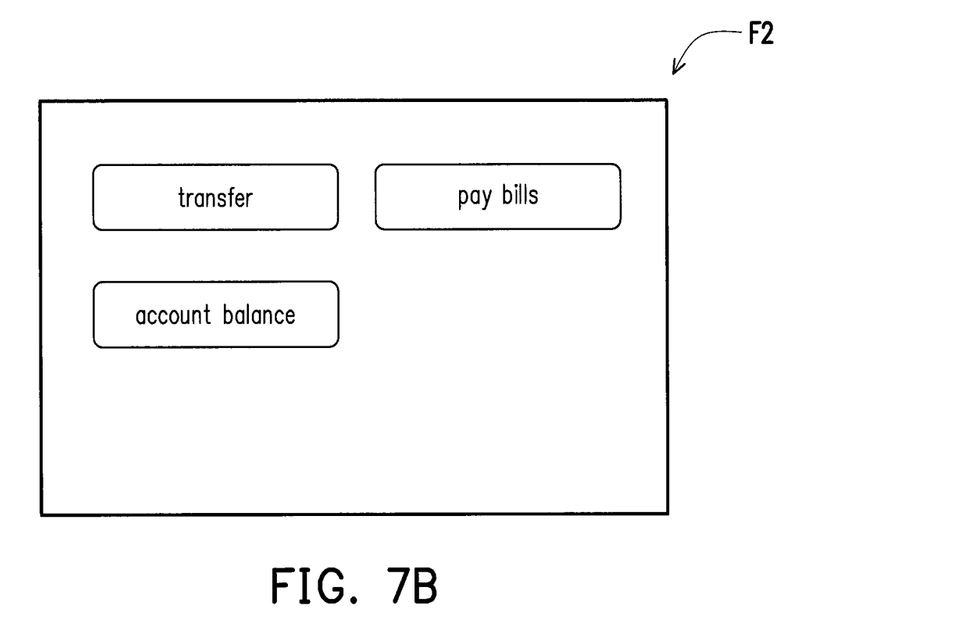

Subsequently, based on the motion trajectory and the eye movement status of the eye, the control unit 110 can then execute the financial transaction procedure in the financial transaction device 100, as shown in step S415 to step S430. In step S415, the financial transaction module 150 provides a financial transaction interface on the display unit 180 of the financial transaction device 100. For instance, FIG. 7A and FIG. 7B are schematic diagrams illustrating a financial transaction interface according to an embodiment of the invention. FIG. 7A shows a financial transaction interface for an online transaction, and an input menu currently displayed is a password inputting screen F1.

Additionally, an emergency mode may also be displayed in the financial transaction interface for detecting the eye movement status of the user by the eye movement detection module 160 in case the user is under duress, such that whether the emergency mode is enabled can be determined based on the eye movement status. For example, an emergency mode 510 is displayed in the password inputting screen F1. When the eye movement detection module 160 detects that the eye of the user gazing at the emergency mode 510 for a preset time (e.g., 1.5 to 2 seconds), the emergency mode 510 is enabled. When the emergency mode 510 is enabled, the financial transaction device 100 transmits an emergency signal to the security equipment 16 by the communication unit 140. Thereafter, steps S420 to S430 continues to be executed. In other words, even if the emergency mode 150 is selected by the user, the financial transaction device 100 still continues to execute the subsequent transaction procedure while informing the security equipment 16.

Subsequently, in step S420, the eye movement detection module 160 detects a plurality of gazing locations on the financial transaction interface gazed by the eye of the user to thereby confirm a password string. For example, a plurality of numbers (e.g., a numeric keyboard 520 in FIG. 7A) are displayed on the password inputting screen F1 of the financial transaction interface. If the gazing time of the eye of the user gazing at one of the numbers exceeds the preset time (e., 2 seconds), or the user blinks twice after the eye of the user gazing at that number, it can be confirmed that the number corresponding to the current gazing location is the number to be inputted. By analogy, the password string can by inputted one by one. After the password string is received, the control unit 110 can determine whether the password string matches a preset password by using the password authentication module 170.

In step S425, when the password string matches the preset password, a selection is performed on a plurality of operating functions according to the motion trajectory and the eye movement status of the eye on the financial transaction interface. As shown in FIG. 7B, when the password string matches the preset password, the input menu displayed in the financial transaction interface is, for example, a menu selection screen F2. The eye movement detection module 160 can then detect the sight location of the eye of the user together with other actions such as the blinking to serve as a confirmation signal to thereby perform the selection on the operating functions. Thereafter, the operating information of the user may be inputted by the eye tracking procedure. That is to say, in step S430, the control unit 110 executes a corresponding transaction according to one operating function being selected.

For example, when the eye movement detection module 160 detects that the sight location is located on a function "transfer" and detects that the blinking is rapidly made twice, the control unit 110 can switch a display screen thereof to a transfer screen for performing transfer actions. The transfer screen is similar to a screen presented by a general automatic teller machine (ATM) web page, and thus related description thereof is omitted hereinafter. After entering the transfer screen (another input menu), the eye movement detection module 160 executes the eye tracking procedure (e.g., actions like determining the sight location, whether blinking is made at the sight location, etc.) as mentioned above, so as to enable the function corresponding to the sight location.

The functions "pay bills" and "account balance" are also similar to the functions in the general automatic teller machine (ATM) web page, and thus related description thereof is omitted hereinafter.

If the financial transaction card includes a function of an electronic wallet, the user may even perform the transaction by using the electronic wallet of the financial transaction card. For instance, the user may open a home page provided by the electronic store 15 with a browser in the financial transaction device 100. Then, an ordering procedure with the electronic wallet may be started after browsing, purchasing and entering a checkout procedure. Before using the electronic wallet, the user may input a password of the electronic wallet by using aforesaid eye tracking procedure. Once a confirm button is enabled, the password is then being checked. If the password is verified and passed, the certification authority 11 can then verify the digital certificate. After the digital certificate is verified and passed, the certification authority 11 can inform the same to the acquiring bank 12, so as complete actions for payment. Aforesaid transaction process is known as a secure transaction technology for example.

Figure 8:
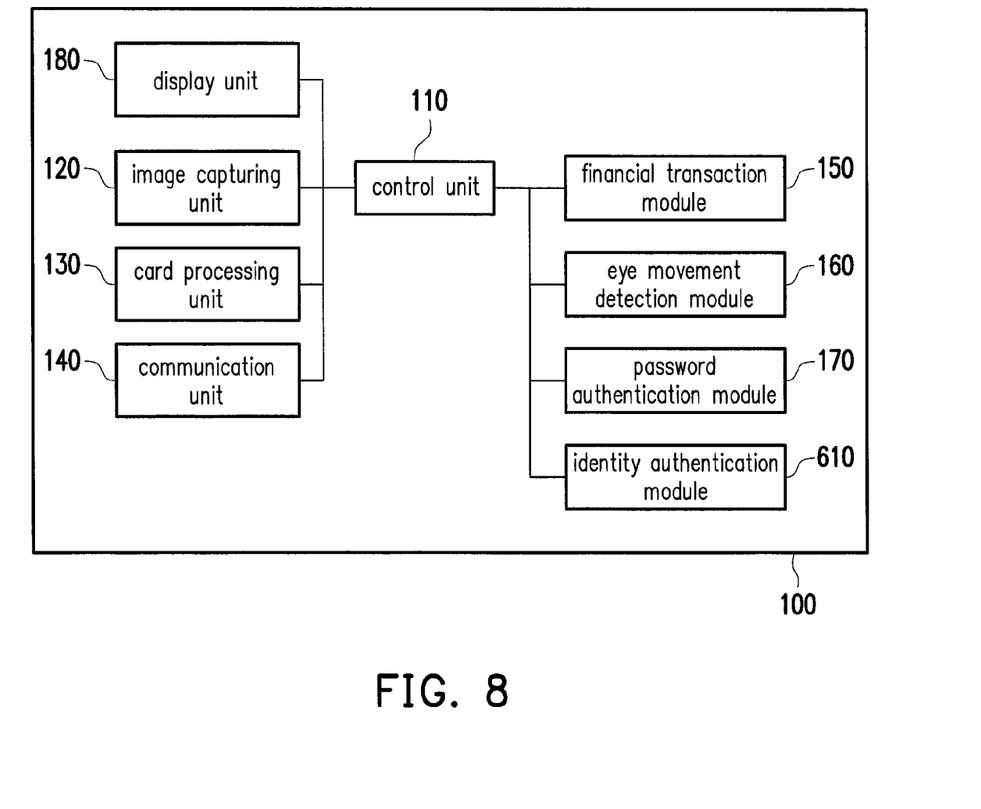
FIG. 8 is a block diagram of a financial transaction device according to another embodiment of the invention.

Further, before the eye image sequence procedure is executed on the eye image sequence (i.e., before step S410), the identity of the user may be further identified by using a human face recognition, an iris recognition, a sclera vascular pattern recognition or a combination of aforesaid recognitions. For instance, FIG. 8 is a block diagram of a financial transaction device according to another embodiment of the invention. A difference between FIG. 8 and FIG. 4 is that, in the present embodiment, the financial transaction device 100 further includes an identity authentication module 610 (which can be composed of program code segments and stored in the storage unit, or can be a chip set composed of one or more digital logic gates), so that the human face recognition and the iris recognition can be executed by the identity authentication module 610. That is to say, a current human face feature and a current eye feature may be obtained from the face image sequence. Then, whether the current human face feature matches a preset human face feature may be compared, and whether the current eye feature matches a preset eye feature may be compared. The control unit 110 drives the financial transaction module 150 to provide the financial transaction interface on the display unit 180 of the financial transaction device 100 only when the current human face feature matches the preset human face feature and the current eye feature matches the preset eye feature.

Further, in other embodiments, the financial transaction device 100 can also transmit the face image sequence to the certification authority 11 of the server terminal, so that the certification authority 11 may execute an authentication procedure of the financial transaction device 100 (the user terminal) according to the face image sequence. In other words, the preset human face feature and the preset eye feature corresponding to the registered user may be established in the certification authority 11 in advance.

Figure 9A:
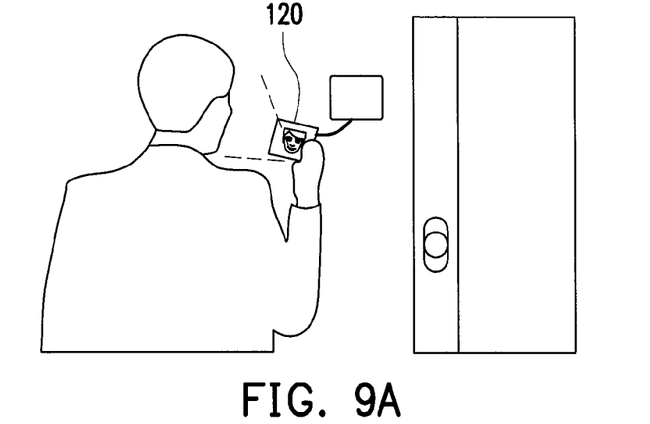
FIG. 9A to FIG. 9C are schematic diagrams illustrating operations of a handheld input device according to another embodiment of the invention.
Figure 9B:
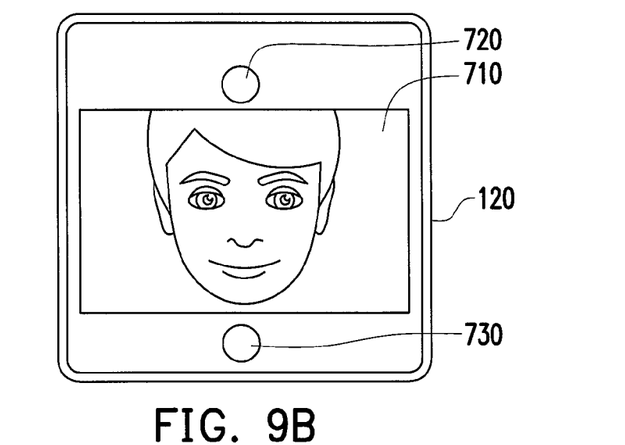
Figure 9C:
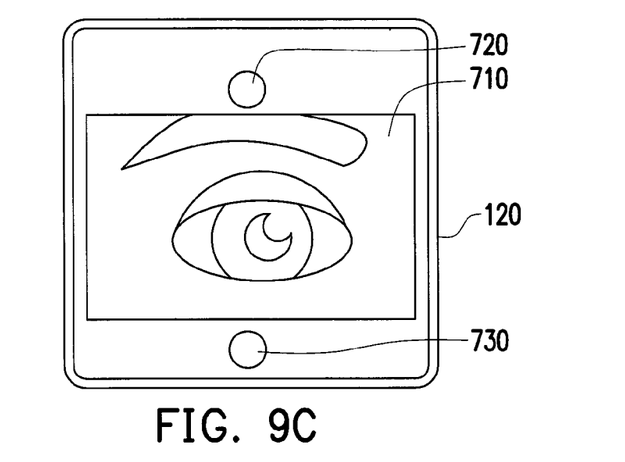

In the present embodiment, the image capturing unit 120 is, for example, disposed in a handheld input device, and the user can hold the handheld input device to have the image capturing unit 120 facing to the user's face, so as to capture an image sequence including the human face. FIG. 9A to FIG. 9C are schematic diagrams illustrating operations of a handheld input device according to another embodiment of the invention. As shown in FIG. 9A, the user picks up the handheld input device, and makes the image capturing unit 120 facing the user's face. Herein, the image capturing unit 120 of the handheld input device further includes a display unit 710. At the mean time, the display unit 710 displays a captured face image as shown in FIG. 9B, or an eye image as shown in FIG. 9C.

Herein, the preset human face feature and the preset eye feature of the user may be established in the financial transaction card in advance. Alternatively, the preset human face feature and the preset eye feature of the user may be stored in a could database, so that the financial transaction device 100 may only obtain the preset human face feature and the preset eye feature of the user of the financial transaction card from the cloud database by the communication unit 140 when the comparisons are to be made. As another example, the preset human face feature and the preset eye feature of the user may be stored in the certification authority 11, so that the financial transaction device 100 may directly transmit the face image sequence to the certification authority 11 of the server terminal for the authentication procedure. It is emphasized that above-mentioned examples are not intended to limit the invention. Accordingly, whether the current user is an authorized user of the financial transaction card may be determined based on the preset human face feature and the preset eye feature.

In addition, the image capturing unit 120 includes a first lens 720 and a second lens 730. The first lens 720 is configured to capture the face image sequence, and the second lens 730 (e.g., an iris capturing lens) is configured to capture the eye image.

For example, a plurality of face image sequences may be captured by the image capturing unit 120. Subsequently, the control unit 110 can drive the identity authentication module 610 to analyze the image sequence to obtain the current human face feature, and determine whether the current human face feature matches the preset human face feature. The identity authentication module can use the AdaBoost algorithm or other existing human face reorganization algorithm (e.g., executing the human face reorganization by using the Haar-like feature) to obtain the face object in the image sequence, so as to capture the current human face feature from the face object.

If the current human face feature matches the preset human face feature, the second lens 730 captures the image sequence including the eye images. As such, the control unit 110 can further capture the current eye feature of the user from the image sequence by the identity authentication module 610, and determine whether the current eye feature matches the preset eye feature. In a more preferable embodiment, aforesaid eye feature may be an iris feature or a sclera vascular pattern feature. If the current eye feature matches the preset eye feature, the identity authentication module 610 can determine that the current user is the authorized user. Alternatively, the second lens 730 can capture the eye feature first, and the first lens 720 can capture the face image to compare whether the current eye feature matches the preset eye feature only when the current human face feature matches the preset human face feature.

Generally, iris/sclera vascular pattern is full of features that can be quantified to clearly identify the human eye, and the identity authentication module 610 can execute the recognitions by analyzing modes of the features and their spatial relations. The identity authentication module 610 can also eliminate places (e.g., places covered by eyelids, deep shadow, specular reflection, etc.) from the eye area in advance, and rapidly locate a suitable and applicable block, so that the eye feature can be captured from the block for analysis.

On the other hand, if the identity authentication module 610 determines that the current human face feature and the current eye feature do not match the preset human face feature and the preset eye feature, it indicates that the current user is not the authorized user. In this case, the authentication procedure ends, and the financial transaction is not provided to the display unit 180. In addition, when the currently human face matches the preset human face feature but the current eye feature does not match the preset eye feature, it is still determined that the user is not the authorized user, and the authentication procedure also ends accordingly.

Figure 10:
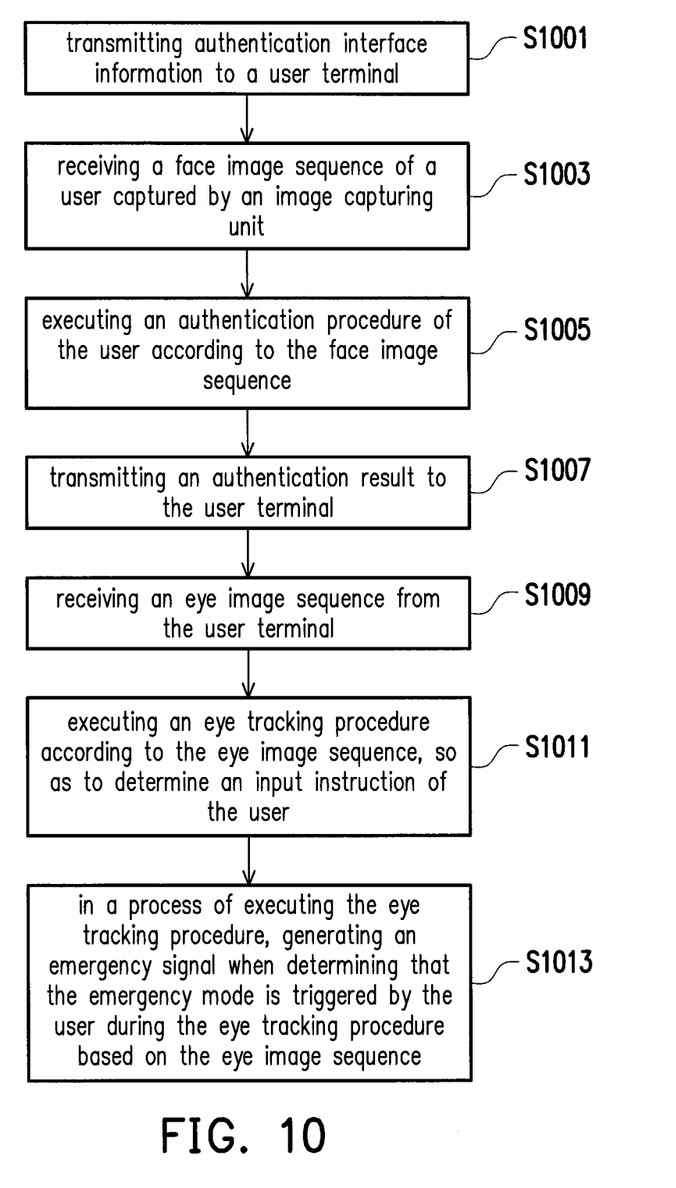
FIG. 10 is a flowchart illustrating a network authentication method based on an eye tracking procedure applied in a server terminal according to an embodiment of the invention.

Further description is provided with reference to the network authentication system A of FIG. 1 in an operating perspective of the server terminal 2. FIG. 10 is a flowchart illustrating a network authentication method based on an eye tracking procedure applied in a server terminal according to an embodiment of the invention. Referring to FIG. 1 and FIG. 10 together, in step S1001, the server terminal 2 transmits authentication interface information to the user terminal 1, and said authentication interface information is displayed on the display unit 180 of the user terminal 1. Herein, the authentication interface information has an emergency mode.

Subsequently, in step S1003, the server terminal 2 receives the face image sequence of the user captured by the image capturing unit 120.

Thereafter, in step S1005, the server terminal 2 executes an authentication procedure of the user according to the face image sequence. For example, the server terminal 2 includes a certification authority, and certification authority stores biological features related to an authorized user (e.g., the preset human face feature or the preset eye feature). When the server terminal 2 receives the face image sequence, the certification authority can execute the face recognition or the eye recognition on the face image sequence, so as to execute the authentication procedure of the user terminal 1. Thereafter, in step S1007, the server terminal 2 transmits an authentication result to the user terminal 1. The authentication result includes, for example, whether the authentication procedure is verified and passed or the authentication procedure is not verified.

Then, in step S1009, the server terminal 2 receives the eye image sequence from the user terminal 1. In the present embodiment, analysis of the eye image sequence is executed by the server terminal 2. That is, an eye movement detection module is installed in the server terminal 2. The eye image sequence is one eye image sequence captured by the image capturing unit 120 of the user terminal 1 when the authentication result is verified and passed and the authentication interface information is displayed on the display unit 180 of the user terminal 1.

Then, in step S1011, the user terminal 1 executes an eye tracking procedure according to the eye image sequence, so as to determine an input instruction of the user. For example, the server terminal 2 transmits the operating information of the eye tracking procedure executed based on the eye image sequence to the user terminal 1, so that the user terminal 1 can execute a corresponding function according to the received operating information.

Further, in step S1013, in a process of executing the eye tracking procedure, the server terminal 2 automatically generates an emergency signal if the server terminal determines that the emergency mode is triggered by the user during the eye tracking procedure based on the eye image sequence.

In summary, the user is able to execute the eye tracking procedure during the authentication procedure by the eyeball movement, such that the operations thereof are more diverse. Furthermore, the network authentication system may also be operated by the eye movement status, such that the operations of the financial transaction device are more diverse. The network authentication system can be easily operated by persons with inconvenient hands to significantly improve the convenience in use for them.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A network authentication method based on an eye tracking procedure, comprising:
   receiving authentication interface information into a user terminal via a network and showing the authentication interface information on a display of the user terminal;
   capturing a face image sequence from a user by an image capturing device of the user terminal;
   transmitting the face image sequence to a server terminal through the user terminal such that the server terminal executes an authentication procedure of the user according to the face image sequence;
   receiving an authentication result from the server terminal into the user terminal;
   capturing an eye image sequence of the user by the image capturing device when the authentication result is verified and passed; and
   executing the eye tracking procedure according to the eye image sequence, so as to determine an input instruction of the user, including:
      displaying a financial transaction interface on the display of the user terminal according to the authentication interface information by the user terminal;
      detecting a plurality of gazing locations on the eye authentication interface gazed by the user to thereby confirm a password string by the user terminal;
      verifying whether the password string matches a preset password corresponding to a financial transaction card by the user terminal;
      when the password string matches the preset password, performing a selection on a plurality of operating functions according to a motion trajectory and an eye movement status of an eye on the financial transaction interface by the user terminal; and
      executing a corresponding transition action according to one of the operating functions being selected by the user terminal.

2. The network authentication method based on the eye tracking procedure as claimed in claim 1, wherein the authentication interface information has an emergency mode, and the user terminal transmits an emergency signal to the server terminal if the emergency mode is triggered by the user during the eye tracking procedure.

3. The network authentication method based on the eye tracking procedure as claimed in claim 1, wherein before the step of executing the eye tracking procedure, the network authentication method comprises:
   receiving a face recognition result from the server terminal to the user terminal;
   wherein when the face recognition result is verified and passed, the authentication interface information is displayed on the display of the user terminal, and the eye image sequence of the user is captured by the image capturing device of the user terminal.

4. The network authentication method based on the eye tracking procedure as claimed in claim 1, wherein before the step of executing the eye tracking procedure, the network authentication method comprises:
   receiving an eye recognition result from the server terminal to the user terminal;
   wherein when the eye recognition result is verified and passed, the authentication interface information is displayed on the display, and the eye image sequence of the user is captured by the image capturing device of the user terminal.

5. The network authentication method based on the eye tracking procedure as claimed in claim 4, wherein the eye recognition result comprises an iris recognition result or a sclera vascular pattern recognition result.

6. The network authentication method based on the eye tracking procedure as claimed in claim 1, wherein the image capturing device irradiates the user by using a light-emitting device, so as to capture a pupil location and a reflex point location of the user,
   wherein in the step of executing the eye tracking procedure, the user terminal determines a sight location of the user on the financial transaction interface based on the pupil location and the reflex point location.

7. The network authentication method based on the eye tracking procedure as claimed in claim 6, wherein the step of executing the eye tracking procedure further comprises:
   obtaining a face object of the user in the eye image sequence;
   searching a nostril area in the face object to obtain nostril location information;
   estimating an eye search frame according to the nostril location information in order to detect an eye area within the eye search frame; and
   obtaining the pupil location and the reflex point location of the user within the eye area, so as to determine the sight location of the user on the authentication interface information according to the pupil location and the reflex point location.

8. The network authentication method based on the eye tracking procedure as claimed in claim 1, further comprising
   displaying the financial transaction interface on the display of the user terminal according to the authentication interface information when the authentication result is verified and passed, wherein the financial transaction interface includes an input menu for the user to input a password string through the eye tracking procedure; and
   capturing the eye image sequence of the user gazing at the input menu by the image capturing device to obtain the password string based on the eye image sequence.

9. The network authentication method based on the eye tracking procedure as claimed in claim 8, wherein the step of obtaining the password string further comprising:
   determining an eye movement status of the eye of the user when gazing at one of a plurality of numbers showed in the input menu, wherein the eye movement status includes a blinking movement, a gazing time, a pupil shift quantity and a sight direction; and
   determining one of the numbers to be outputted based on the eye movement status.

10. The network authentication method based on the eye tracking procedure as claimed in claim 1, wherein before the step of executing the eye tracking procedure, the network authentication method further comprises executing a calibration procedure, and the step of executing the calibration procedure includes:
    sequentially receiving a plurality of calibration images by the image capturing device, wherein the calibration images are images which are respectively obtained when the user is looking at a plurality of calibration points of the display;
    obtaining a reference calibration parameter according to at least one reflex point location of an eye area in each of the calibration images, wherein the at least one reflex point location is formed when each of the calibration images is captured by the image capturing device; and
    generating a coordinate transformation matrix by a perspective transformation method based on the calibration images, wherein the coordinate transformation matrix is configured to transform a coordinate position of the eye area into a coordinate position of the display.

11. The network authentication method based on the eye tracking procedure as claimed in claim 1, further comprising transmitting a digital certificate from the user terminal to the server terminal as a proof of identity.

12. A network authentication system based on an eye tracking procedure, comprising:
    a server terminal including:
        a certification authority, executing the authentication procedure of the user terminal: and
        a security equipment, receiving an emergency signal form the user terminal;
    a user terminal, connected to the server terminal via a network, and the user terminal including:
        a communication device, connected to the network;
        a display, displaying authentication interface information received from the server terminal;
        a card processing device, reading a financial transaction card; and
        a storage device comprising an eye movement detection module, a financial transaction module and a password authentication module;
        an image capturing device, capturing a face image sequence of a user; and
        a processor, coupled to the communication device, the display and the image capturing device, wherein the processor transmits the face image sequence to the server terminal by the communication device such that the server terminal executes an authentication procedure of the user terminal according to the face image sequence and receives an authentication result from the server terminal by the communication device, and the processor drives an eye movement detection module to realize an eye tracking procedure when the authentication result is verified and passed, and the processor drives the financial transaction module and the password authentication module to realize a financial transaction procedure;
    wherein when the authentication result is verified and passed, the authentication interface information is displayed on the display, and an eye image sequence of the user of the user terminal is captured by the image capturing device for the eye movement detection module to execute the eye tracking procedure according to the eye image sequence, so as to input operating information of the user through the eye tracking procedure;
    wherein in the user terminal,
        a financial transaction interface is displayed on the display of the user terminal according to the authentication interface information, and a plurality of gazing locations on the eye authentication interface gazed by the user are detected by the eye movement detection module to thereby confirm a password string;
        the password authentication module verifies whether the password string matches a preset password corresponding to the financial transaction card, wherein when the password string matches the preset password, the financial transaction module performs a selection on a plurality of operating functions according to a motion trajectory and an eye movement status of the eye on the financial transaction interface, and the financial transaction module executes a corresponding transition action according to one of the operating functions being selected.

13. The network authentication system based on the eye tracking procedure as claimed in claim 12, wherein the authentication interface information has an emergency mode, and the processor transmits an emergency signal to the server terminal by the communication device if the eye movement detection module determines that the emergency mode is triggered by the user during the eye tracking procedure based on the eye image sequence.

14. The network authentication system based on the eye tracking procedure as claimed in claim 12, wherein the processor receives a face recognition result from the server terminal,
wherein when the face recognition result is verified and passed, the image capturing device of the user terminal captures the eye image sequence of the user of the user terminal.

15. The network authentication system based on the eye tracking procedure as claimed in claim 12, wherein the processor receives an eye recognition result from the server terminal,
wherein when the eye recognition result is verified and passed, the image capturing device of the user terminal captures the eye image sequence of the user of the user terminal.

16. The network authentication system based on the eye tracking procedure as claimed in claim 15, wherein the eye recognition result comprises an iris recognition result and a sclera vascular pattern recognition result.

17. The network authentication system based on the eye tracking procedure as claimed in claim 12, wherein the image capturing device irradiates the user by using a light-emitting device, so as to capture a pupil location and a reflex point location of the user,
wherein in a process of executing the eye tracking procedure, the eye movement detection module determines a sight location of the user on the authentication interface information by using the pupil location and the reflex point location.

18. The network authentication system based on the eye tracking procedure as claimed in claim 17, wherein in the process of executing the eye tracking procedure, the eye movement detection module executes the following actions: obtaining a face object of the user in the eye image sequence; searching a nostril area in the face object to obtain nostril location information; estimating an eye search frame according to the nostril location information in order to detect an eye area within the eye search frame; and obtaining the pupil location and the reflex point location of the user within the eye area, so as to determine the sight location of the user on the authentication interface information according to the pupil location and the reflex point location.

19. The network authentication system based on the eye tracking procedure as claimed in claim 12, wherein an eye authentication interface is displayed on the display of the user terminal according to the authentication interface information when the authentication result is verified and passed, wherein the eye authentication interface comprises an input menu for the user to perform an eye movement inputting of a password string; and
the image capturing device of the user terminal captures the eye image sequence of the user gazing at the input menu such that the eye movement detection module obtains the password string based on the eye image sequence.

20. The network authentication system based on the eye tracking procedure as claimed in claim 19, wherein the eye movement detection module determines an eye movement status of an eye of the user when gazing at one of a plurality of numbers included in the input menu, and determines one of the numbers to be outputted based on the eye movement status, wherein the eye movement status comprises at least one of a blinking movement, a gazing time, a pupil shift quantity and a sight direction.

21. The network authentication system based on the eye tracking procedure as claimed in claim 12, wherein before executing the eye tracking procedure, the processor drives a calibration module to execute a calibration procedure, and the calibration procedure comprises: sequentially receiving a plurality of calibration images by the image capturing device, wherein the calibration images are images including the user which are respectively obtained when the user is looking at a plurality of calibration points of the display; obtaining a reference calibration parameter according to at least one reflex point location of an eye area in each of the calibration images, wherein the at least one reflex point location is formed when each of the calibration images is captured by the image capturing device; and generating a coordinate transformation matrix by a perspective transformation method based on the calibration images, wherein the coordinate transformation matrix is configured to transform a coordinate position of the eye area into a coordinate position of the display.

22. A network authentication method based on an eye tracking procedure, suitable for a server terminal, and comprising:
transmitting an authentication interface information to a user terminal to be displayed on a display of the user terminal, wherein the authentication interface information has an emergency mode;
receiving a face image sequence of a user of the user terminal captured by an image capturing device of the user terminal from the user terminal;
executing an authentication procedure of the user terminal according to the face image sequence;
transmitting an authentication result to the user terminal;
receiving an eye image sequence from the user terminal, wherein the eye image sequence is captured by the image capturing device of the user terminal when the authentication result is verified and passed and the authentication interface information is displayed on the display of the user terminal;
executing an eye tracking procedure according to the eye image sequence, so as to input operating information of the user through the eye tracking procedure, including:
displaying a financial transaction interface on the display of the user terminal according to the authentication interface information by the user terminal;
detecting a plurality of gazing locations on the eye authentication interface gazed by the user to thereby confirm a password string by the user terminal;
verifying whether the password string matches a preset password corresponding to a financial transaction card by the user terminal;
when the password string matches the preset password, performing a selection on a plurality of operating functions according to a motion trajectory and an eye movement status of an eye on the financial transaction interface by the user terminal; and
executing a corresponding transition action according to one of the operating functions being selected by the user terminal; and
in a process of executing the eye tracking procedure, generating an emergency signal when determining that the emergency mode is triggered by the user during the eye tracking procedure based on the eye image sequence.

\* \* \* \* \*